United States Patent [19]

McClary

[11] Patent Number: 4,460,970
[45] Date of Patent: Jul. 17, 1984

[54] DIGITAL DATA PROCESSING SYSTEM USING UNIQUE TECHNIQUES FOR HANDLING THE LEADING DIGITS AND THE SIGNS OF OPERANDS IN ARITHMETIC OPERATIONS

[75] Inventor: Elmer R. McClary, DeKalb, Ill.

[73] Assignee: Data General Corporation, Westboro, Mass.

[21] Appl. No.: 266,528

[22] Filed: May 22, 1981

[51] Int. Cl.$^3$ ............................................. G06F 7/52
[52] U.S. Cl. ................................. 364/761; 364/766
[58] Field of Search ............... 364/761, 766, 764, 768, 364/736, 748

[56] References Cited

U.S. PATENT DOCUMENTS 3,346,727  10/1967  Lethin et al. ..................... 364/761
3,816,733  6/1974  Sathev ............................. 364/766

OTHER PUBLICATIONS

Chiv et al., "Binary Divide Mechanism", *IBM Tech. Disclosure Bulletin*, vol. 19, No. 6, Nov. 1976, pp. 2015–2017.
Sanyal, "An Algorithm for Nonrestoring Division", *Computer Design*, May 1977, pp. 124–127.

*Primary Examiner*—David H. Malzahn
*Attorney, Agent, or Firm*—Robert F. O'Connell

[57] ABSTRACT

In a data processing system, an arithmetic logic means which determines the numbers of leading digits containing zero numeric values and the signs of operands supplied thereto and which discards the leading zero digits in such operands and performs the desired arithmetic operation on the remaining digits in order to reduce the number of steps needed to provide an unsigned arithmetic result. The sign required for such unsigned result is then determined from the signs of the operands.

3 Claims, 1 Drawing Figure

DIGITAL DATA PROCESSING SYSTEM USING UNIQUE TECHNIQUES FOR HANDLING THE LEADING DIGITS AND THE SIGNS OF OPERANDS IN ARITHMETIC OPERATIONS

CROSS REFERENCE TO RELATED APPLICATIONS

The present patent application is related to other patent applications assigned to the assignee of the present invention.

BACKGROUND OF THE INVENTION

1. Field of the Invention

The present invention relates to a digital data processing system and, more particularly, to a multiprocess digital data processing system suitable for use in a data processing network and having a simplified, flexible user interface and flexible, multileveled internal mechanisms.

2. Description of Prior Art

A general trend in the development of data processing systems has been towards systems suitable for use in interconnected data processing networks. Another trend has been towards data processing systems wherein the internal structure of the system is flexible, protected from users, and effectively invisible to the user and wherein the user is presented with a flexible and simplified interface to the system.

Certain problems and shortcomings affecting the realization of such a data processing system have appeared repeatedly in the prior art and must be overcome to create a data processing system having the above attributes. These prior art problems and limitations include the following topics.

First, the data processing systems of the prior art have not provided a system wide addressing system suitable for use in common by a large number of data processing systems interconnected into a network. Addressing systems of the prior art have not provided sufficiently large address spaces and have not allowed information to be permanently and uniquely identified. Prior addressing systems have not made provisions for information to be located and identified as to type or format, and have not provided sufficient granularity. In addition, prior addressing systems have reflected the physical structure of particular data processing systems. That is, the addressing systems have been dependent upon whether a particular computer was, for example, an 8, 16, 32, 64 or 128 bit machine. Since prior data processing systems have incorporated addressing mechanisms wherein the actual physical structure of the processing system is apparent to the user, the operations a user could perform have been limited by the addressing mechanisms. In addition, prior processor systems have operated as fixed word length machines, further limiting user operations.

Prior data processing systems have not provided effective protection mechanisms preventing one user from effecting another user's data and programs without permission. Such protection mechanisms have not allowed unique, positive identification of users requesting access to information, or of information, nor have such mechanisms been sufficiently flexible in operation. In addition, access rights have pertained to the users rather than to the information, so that control of access rights has been difficult. Finally, prior art protection mechanisms have allowed the use of "Trojan Horse arguments". That is, users not having access rights to certain information have been able to gain access to that information through another user or procedure having such access rights.

Yet another problem of the prior art is that of providing a simple and flexible interface user interface to a data processing system. The character of user's interface to a data processing system is determined, in part, by the means by which a user refers to and identifies operands and procedures of the user's programs and by the instruction structure of the system. Operands and procedures are customarily referred to and identified by some form of logical address having points of reference, and validity, only within a user's program. These addresses must be translated into logical and physical addresses within a data processing system each time a program is executed, and must then be frequently retranslated or generated during execution of a program. In addition, a user must provide specific instructions as to data format and handling. As such reference to operands or procedures typically comprise a major portion of the instruction stream of the user's program and requires numerous machine translations and operations to implement. A user's interface to a conventional system is thereby complicated, and the speed of execution of programs reduced, because of the complexity of the program references to operands and procedures.

A data processing system's instruction structure includes both the instructions for controlling system operations and the means by which these instructions are executed. Conventional data processing systems are designed to efficiently execute instructions in one or two user languages, for example, FORTRAN or COBOL. Programs written in any other language are not efficiently executable. In addition, a user is often faced with difficult programming problems when using any high level language other than the particular one or two languages that a particular conventional system is designed to utilize.

Yet another problem in conventional data processing systems is that of protecting the system's internal mechanisms, for example, stack mechanisms and internal control mechanisms, from accidental or malicious interference by a user.

Finally, the internal structure and operation of prior art data processing systems have not been flexible, or adaptive, in structure and operation. That is, the internal structure and operation of prior systems have not allowed the systems to be easily modified or adapted to meet particular data processing requirements. Such modifications may include changes in internal memory capacity, such as the addition or deletion of special purpose subsystems, for example, floating point or array processors. In addition, such modifications have significantly effected the users interface with the system. Ideally, the actual physical structure and operation of the data processing system should not be apparent at the user interface.

The present invention provides data processing system improvements and features which solve the above-described problems and limitations.

SUMMARY OF THE INVENTION

The present invention relates to techniques for performing arithmetic operations in a data processing system. An arithmetic logic means (ALU) responds to received operands and determines both the numbers of leading digits containing zero numeric values in each operand and the signs of each operand. The operands are shifted so as to discard the leading digits containing zero values in each operand and the desired arithmetic operation is performed on the remaining digits of each operand to produce an unsigned result, thereby reducing the number of steps in the desired arithmetic operation. The sign of the result is determined using the sign of each operand and the appropriate sign is then provided for the unsigned result to produce an overall signed result for the intended operation. Such technique is used, for example, in a unique integer division operation on a pair of input operands.

BRIEF DESCRIPTION OF DRAWINGS

The FIGURE is a partial block diagram of a computer system incorporating the present invention.

This application incorporates by reference the entire application, Ser. No. 266,402, filed on May 22, 1981, of Baxter et al.

Figure 1:
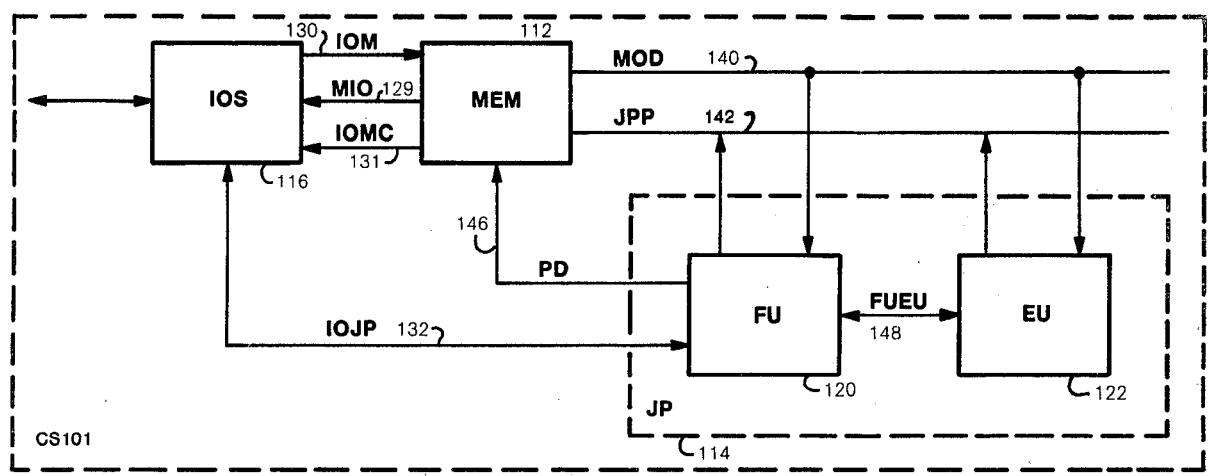

More particularly, attention is directed to FIG. 203 of the drawings in application Ser. No. 266,402, and to that part of the descriptive portion of the specification, particularly at pages 553-555, 592, 600, 605, 606, 608 and 609 thereof, which relate to the subject matter of the claims herein.

What is claimed is:

1. In a digital computer system, arithmetic processor means for performing operations on at least signed integer operands comprising numeric values in the form of binary integer values, said arithmetic processor means comprising:

ALU means having a first input for receiving said operands and an output for providing results of ALU operations, said ALU means including means connected to said first input and responsive to said received operands for performing arithmetic, logical, and shifting operations on said operands, means responsive to said received operands for determining the numbers of leading digits containing zero numeric values in each of said operands, and means responsive to said received operands for determining the signs of each of said operands;

memory means connected to said ALU means output for storing the results of said ALU operations;

selector means having a first input connected to an output of said memory means, and a second input connected to said ALU means output, and a read output connected to a second input of said ALU means for selecting inputs to said second input of said ALU means; and, means for controlling the operations of said arithmetic processor means;

said ALU means, said memory means, and said selector means responsive to said control means for performing said operations which operations comprise:

(1) receiving first and second operands into said ALU means, and (a) determining the numbers of the leading digits containing zero numeric values of said first and second operands, (b) determining the signs of said first and second operands, and (c) storing said numbers of the leading digits containing zero numeric values, said signs of said first and second operands, and said first and second operands in said memory means, (2) reading said numbers of the leading digits of said first and second operands containing zero numeric values and said first and second operands from said memory means to said ALU means, and (a) shifting said first and second operands to reduce the required number of steps of an intended one of said operations by discarding certain of said leading digits containing zero numeric values, (b) performing said intended one of said operations on the remaining digits of said first and second operands to obtain an unsigned result, and (c) storing said unsigned result in said memory means, (3) reading said signs of said first and second operands from said memory means to said ALU means and determining the sign of the result of said intended one of said operations, and (4) providing said sign of said result and said unsigned result as the signed result of said intended one of said operations on said first and second operands.

2. In a digital computer system including arithmetic processor means for performing operations on at least signed integer operands comprising numeric values in the form of binary integer values, said arithmetic processor means including:

ALU means having a first input for receiving said operands and an output for providing results of ALU operations, said ALU means including means connected to said first input and responsive to said received operands for performing arithmetic, logical, and shifting operations on said operands, means responsive to said received operands for determining the numbers of leading digits containing zero numeric values in each one of said operands, and means responsive to said received operands for determining the signs of said each of said operands;

memory means connected to said ALU means output for storing the results of said ALU operations;

selector means having a first input connected to an output of said memory means, and a second input connected to said ALU means output, and a read output connected to a second input of said ALU means for selecting inputs to said second input of said ALU means; and means for controlling the operations of said arithmetic processor means;

a method of performing integer division of said operands, comprising the steps of:

(a) preparing each of first and second integer operands for said integer division operation, said first integer operand being a divisor operand and said second integer operand being a dividend operand by (1) receiving one of said first and second integer operands into said arithmetic ALU means, (2) determining the number of leading zero digits in said one of said integer operands and the sign of said one of said integer operands, (3) storing a leading zero value for said number of leading zero digits and a sign value for said sign of said one of said integer operands in said memory means, (4) obtaining the absolute value of said one of said integer operands, (5) storing said absolute value of said one of said integer operands in said memory means, and (6) repeating steps (a) (1) through (a) (5) for the other of said first and second integer operands;

(b) obtaining a sign control value by (1) reading said sign values for said first and second integer operands from said memory means to said ALU means, (2) comparing said sign values, and (3) storing the result of said comparison in said memory means, (c) obtaining a shift factor value by (1) reading said leading zero value for said divisor operand and said leading zero value for said dividend operand from said memory means to said ALU means, (2) subtracting said leading zero value for said divisor operand from said leading zero value for said dividend operand, (3) adding 1 to the difference resulting from said subtraction, and (4) storing said shift factor value in said memory means;

(d) obtaining a justified divisor operand by (1) reading said absolute value of said divisor operand from said memory means to said ALU means, (2) shifting said absolute value of said divisor operand to the left the number of bits specified by said shift factor value, and (3) storing said justified divisor operand in said memory means;

(e) obtaining a division loop control value by (1) calculating said division loop control value from said shift factor value and (2) storing said loop control value in said memory means;

(f) setting an initial quotient value of 0 in said memory means;

(g) obtaining a partial result by (1) reading said absolute value of said dividend operand and said justified divisor operand from said memory means, (2) subtracting said justified divisor operand from said absolute value of said dividend operand, (3) shifting the difference 1 bit to the left, and (4) storing said difference in said memory means;

(h) obtaining bits of said quotient greater than the least significant bit by reading said justified divisor operand and said partial result from said memory means to said ALU means and repeating the execution of the steps:
  (1) subtracting said justified divisor operand from said partial product,
  (2) storing the difference in said memory means,
  (3) obtaining and storing in said memory means, a value for the sign of said difference,
  (4) shifting said partial result one bit to the left and storing the shifted said partial result in said memory means,
  (5) reading said quotient from said memory means to said ALU means,
  (6) shifting said quotient one bit to the left,
  (7) storing the shifted said quotient in said memory means,
  (8) reading said value for said sign of said difference from said memory means to said ALU means,
  (9) testing said value for said sign of said difference, and if said value for said sign of said difference indicates that said difference was 0 or positive, reading said quotient from said memory means to said ALU means, adding 1 to said quotient, and storing the incremented by 1 said quotient in said memory means,
  (10) reading said division loop control value from said memory means to said ALU means,
  (11) decrementing said division loop control value and testing said division loop control value,
  (12) storing the decremented said division loop control value in said memory means, and
  (13) reading said justified divisor operand and said partial result from said memory means to said ALU means and repeating steps (h) (1) through (h) (13), said repeated execution terminating when said division loop control value reaches a value indicating that said division operation is complete except for said least significant bit of said quotient;

(i) obtaining a remainder by (1) reading said difference of step (h) (1) from said memory means to said ALU means, (2) testing said difference of step (h) (1) to determine said difference sign, (3) storing a value for said difference sign in said memory means, and (4) if said difference sign is negative, calculating said remainder by negating said difference and storing said remainder in said memory means;

(j) obtaining the least significant digit of said quotient by (1) reading said sign value from said memory means to said ALU means, (2) testing said sign value, (3) reading said quotient from said memory means to said ALU means, (4) shifting said quotient 1 bit to the left, (5) if said sign value indicates that said difference is non-negative, add 1 to shifted said quotient, and (6) storing shifted said quotient in said memory means; and, (k) obtaining the sign of said quotient by (1) reading said sign control value from said memory means to said ALU means, (2) if said sign control value indicates a negative quotient, reading said quotient from said memory means to said ALU means, (3) negating said quotient and (4) storing said negated quotient in said memory means.

3. In a digital computer system including arithmetic processor means for performing operations on at least signed integer operands comprising numeric values in the form of binary integer values, said arithmetic processor means including:

ALU means having a first input for receiving said operands and an output for providing results of ALU operations, said ALU means including
means connected to said first input and responsive to said received operands for performing arithmetic, logical, and shifting operations on said operands,
means responsive to said received operands for determining the numbers of leading digits containing zero numeric values in each of said operands, and
means responsive to said received operands for determining the signs of each of said operands;
memory means connected to said ALU means output for storing said results of said ALU operations;
selector means having a first input connected to an output of said memory means, and a second input connected to said ALU means outputs, and a read output connected to a second input of said ALU means for selecting inputs to said second input of said ALU means; and means for directing the operations of said arithmetic processor means;

the method of performing said operations on said operands, comprising the steps of:

(1) receiving first and second of said operands into said ALU means, and (a) determining the numbers of the leading digits containing zero numeric values of said first and second operands, (b) determining the signs of said first and second operands, and (c) storing said numbers of the leading digits containing zero numeric values, said signs of said first and second operands, and said first and second operands in said memory means, (2) reading said numbers of the leading digits of said first and second operands containing zero numeric values and said first and second operands from said memory means to said ALU means, and (a) shifting said first and second operands to reduce the required number of steps of an intended one of said operations by discarding certain of said leading digits containing zero numeric values, (b) performing said intended one of said operations on the remaining digits of said first and second operands to obtain an unsigned result, and (c) storing said unsigned result in said memory means, (3) reading said signs of said first and second operands from said memory means to said ALU means and determining the sign of the result of said intended one of said operations, and (4) providing said sign of said result and said unsigned result as the signed result of said intended one of said operations on said first and second operands.

* * * * *